(12) United States Patent
Chau (10) Patent No.: US 8,704,682 B1
(45) Date of Patent: Apr. 22, 2014

(54) OBJECT DETECTION TO DETERMINE ROAD PRIORITY

(75) Inventor: Stephen Chau, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 13/172,006

(22) Filed: Jun. 29, 2011

(51) Int. Cl.
*G08G 1/123* (2006.01)

(52) U.S. Cl.
USPC ............ 340/995.19; 340/995.13; 340/995.22; 340/995.23; 382/104; 382/105

(58) Field of Classification Search
USPC ............ 340/995.19, 995.13, 995.14, 995.22, 340/995.23, 995.24; 701/201, 200; 382/104, 105
See application file for complete search history.

(56) References Cited

U.S. PATENT DOCUMENTS

| | | | |
|---|---|---|---|
| 7,743,865 B2 | 6/2010 | Brunner et al. | |
| 2003/0225516 A1* | 12/2003 | DeKock et al. | 701/214 |
| 2006/0082472 A1* | 4/2006 | Adachi et al. | 340/995.13 |
| 2008/0040031 A1* | 2/2008 | Tu | 701/209 |
| 2009/0207046 A1* | 8/2009 | Arrighetti | 340/937 |
| 2011/0313649 A1* | 12/2011 | Bales et al. | 701/200 |

* cited by examiner

*Primary Examiner* — Steven Lim
*Assistant Examiner* — Hongmin Fan
(74) *Attorney, Agent, or Firm* — McDermott Will & Emery LLP (57) ABSTRACT

Embodiments relate to road priority and driving directions. In one embodiment, a system includes an object detector module configured: (i) to detect objects of a type in photographic images associated with first and second tracks, and (ii) to determine a first number of times objects of the type appear in photographic images geocoded along the first track, and a second number of times objects of the type appear in photographic images geocoded along the second track. The system also includes a priority score module configured: (i) to generate a first priority score associated with the first track based at least on the first number, and (ii) to generate a second priority score associated with the second track based at least on the second number. The system further includes a driving direction module configured: (i) to select a driving route that includes the track associated with a greater priority score.

21 Claims, 4 Drawing Sheets

OBJECT DETECTION TO DETERMINE ROAD PRIORITY

BACKGROUND

1. Field of the Specification

This specification generally relates to road priority and driving directions.

2. Background

Driving directions can be generated for a user to get from a starting location to an ending location. These driving directions may include a route that is a shortest distance from the starting location to the ending location. The route may not take into account factors other than a distance between the two endpoints, thus not giving the user an optimal route.

BRIEF SUMMARY

In general, one aspect of the subject matter described in this specification may be embodied in a method for determining a driving route that includes a first track or alternatively a second track. The method includes detecting objects of a first type in photographic images associated with the first and second tracks. The method also includes determining a first number of times objects of the first type appear in photographic images geocoded along the first track, and determining a second number of times objects of the first type appear in photographic images geocoded along the second track. The method further includes generating a first priority score associated with the first track based at least on the first number, and generating a second priority score associated with the second track based at least on the second number. The method also includes selecting a driving route that includes the first track when the first priority score is greater than the second priority score, and selecting a driving route that includes the second track when the second priority score is greater than the first priority score.

Other embodiments of these aspects include corresponding systems, apparatuses, and computer program products configured to perform the actions of these methods, encoded on computer storage devices.

Further features and advantages of embodiments described herein, as well as the structure and operation of various embodiments, are described in detail below with reference to the accompanying drawings. It is noted that the embodiments described below are not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS/FIGURES

Embodiments are described with reference to the accompanying drawings. The accompanying drawings, which are incorporated herein and form a part of the specification, illustrate embodiments and, together with the description, further serve to explain the principles of the embodiments and to enable a person skilled in the relevant art to make and use the embodiments. In the drawings, like reference numbers may indicate identical or functionally similar elements. The drawing in which an element first appears is generally indicated by the left-most digit in the corresponding reference number.

DETAILED DESCRIPTION

Embodiments of the present disclosure generally relate to determining a driving route that includes a first track or alternatively a second track. A track may be a path along a route of travel.

A driving direction algorithm may generate a driving route that includes tracks to take a user from a starting location to an ending location. Before the driving route is generated, the driving direction algorithm may take into account different tracks that can be used to get the user from the starting location to the ending location. Information such as whether a track includes a highway, main arterial street, or side street may be important because it affects how fast a car can go along the track.

Street prioritization may be used in a driving direction algorithm that favors high priority streets because vehicles can often drive faster along these streets. For example, side streets have more stop signs, stop lights, and restrictive speed limits than highways, and thus may be slower for a car to take than a highway. A driving direction algorithm that has an option of including a highway instead of side streets may be a more optimal route for a user to take. Street priority may be quantified by detecting objects that appear along a track. Objects associated with a track can be detected and used in a scoring program to determine a priority score associated with the track. In one embodiment, faces may be detected by a face detection algorithm to detect a number of faces along the track. A greater number of faces may indicate a busier street (e.g., main street). The number of detected faces can be used in a scoring algorithm to determine a road priority associated with the track. A driving route may be provided by selecting a track associated with a greater priority score than a priority score associated with an alternative track.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
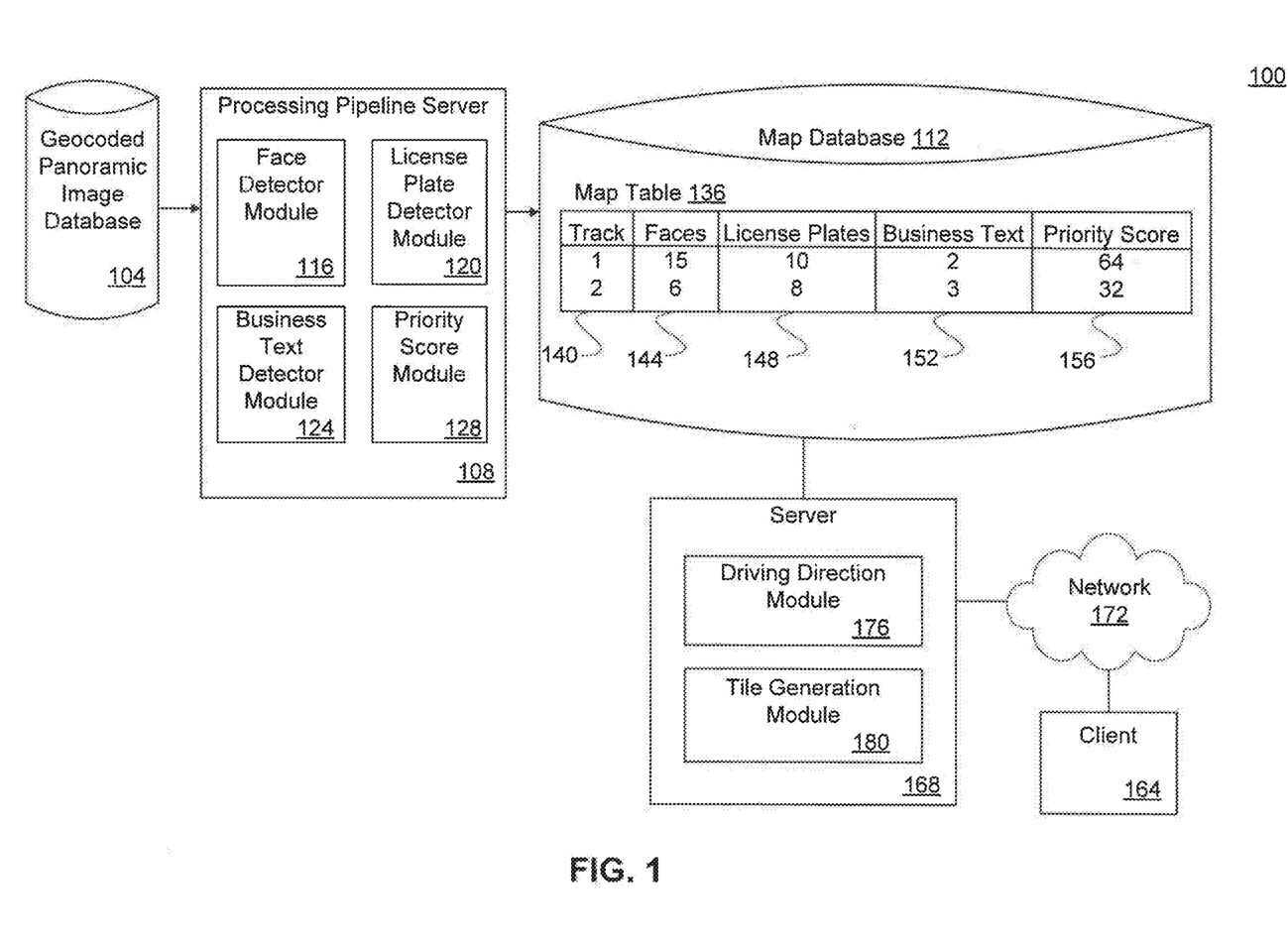
FIG. 1 is a diagram illustrating a system for determining a driving route that includes a first track or a second track based on priority scores determined according to objects detected along the respective tracks, according to an embodiment.

FIG. 1 is a diagram illustrating a system 100 for determining a driving route that includes a first track or a second track based on priority scores determined according to objects detected along the respective tracks, according to an embodiment. System 100 includes a geocoded panoramic image database 104 that stores images. Geocoded panoramic image database 104 may be an image database of unprocessed images (or raw images) associated with a track. The images may be photographic images that include, but are not limited to, portions of panoramic images, such as street-level panoramas.

In one embodiment, street-level panoramas may be collected from a moving vehicle using a custom camera rosette system mounted on a vehicle. The camera rosette may include multiple cameras that are synchronized to capture images that can be stitched together into a panorama. In one example, these images can be high-resolution images stitched together to form a panorama having a high-resolution too. The set of images that can be stitched together into a panorama may be referred to as a panorama set.

Images can be captured from a camera mounted on a moving vehicle from a start of a track to an end of the track. In one embodiment, a camera captures images when a time period "X" elapses (e.g., 10 seconds) until an end of the track is reached. In another embodiment, a camera captures images when a vehicle moves a distance "X" (e.g., 10 feet). In this embodiment, images are taken a distance of "X" apart as the camera captures images. In another embodiment, a controller is coupled to a camera and can determine where along the track the camera has captured the picture. The controller can associate the captured image with the location along the track.

In some embodiments, geocoded panoramic image database 104 includes images from public data sources. The use of images from public data sources may be cost effective and save time in obtaining images associated with tracks. In some embodiments, geocoded panoramic image database 104 includes a combination of images captured from a camera and images from public data sources. These images may be combined and used to determine street priority.

Geocoded panoramic image database 104 is coupled to a processing pipeline server 108, which is further coupled to a map database 112. Processing pipeline server 108 includes a face detector module 116, a license plate detector module 120, a business text detector module 124, and a priority score module 128. Other detector modules for detecting objects may also be used, as would be known to a person skilled in the relevant art. Processing pipeline server 108 may implement computer vision extraction on the images in geocoded panoramic image database 104.

In general, system 100 operates as follows. Processing pipeline server 108 receives an image (e.g., photographic image) from geocoded panoramic image database 104, in one example, processing pipeline server 108 may retrieve the image, for example, using an SQL select statement. In another example, geocoded panoramic image database 104 may push the image to processing pipeline server 108 to reduce processing work.

In one embodiment, when an image is received by processing pipeline server 108, an object detector module detects objects of a particular type in one or more photographic images associated with a track. Detector modules can scan one or more photographic images for objects of a particular type. In one example, face detector module 116 scans a photographic image for faces, license plate detector module 120 scans the photographic image for license plates, and business text detector module 124 scans the photographic image for text designating a business.

The detector modules can also determine a number of times a particular object appears in photographic images geocoded along a track, in one example, face detector module 116 determines a number of times faces appear in photographic images geocoded along a track, license plate detector module 120 determines a number of times license plates appear in photographic images geocoded along a track, and business text detector module 124 determines a number of times text designating a business appear in photographic images geocoded along a track.

To detect particular objects, detector modules may analyze the content of the photographic image. The detection algorithms used by detector modules may vary. For example, license detector module 120 may be optimized based on various details of a license plate or details that are associated with a track (e.g., license plate detection in Europe compared with license plate detection in the United States). In this way, license detector module 120 may be trained to be more accurate in terms of extracting information from an image.

Face detector module 116 may use a sliding window algorithm to detect faces. For example, face detector module 116 may use a standard sliding-window approach. Face detector module 116 may use a linear combination of a heterogeneous set of feature detectors such as Gabor wavelets. The feature detectors may vary in complexity and required computing resources. This example is merely illustrative. Other object detection techniques may be used as would be recognized by a person of skill in the art given this description.

Face detector module 116 may include three separate detectors each with a sliding window algorithm configured to detect objects with different profile angles (pan or yaw) of, for example, 0-30, 30-60, and 60-90 degrees. Face detector module 116 may also include a landmarker, which pinpoints facial feature locations within a region. Features extracted at those locations may be used to obtain a refined score that indicates the probability of a face being present.

Further, a detector module may be trained with a learning algorithm. To build the training set, the detector module may identify objects of a particular type, and a human may manually label the objects of the particular type, e.g. faces, license plates, text designating a business.

Street priority may be quantified by detecting objects that appear in the photographic images.

Priority score module 128 may generate a priority score associated with a track. A priority score may be based on a number of times a particular object appears in a photographic image associated with a track.

In one example, a first track associated with a greater number of faces than a second track may indicate that the first track is busier than the second track, and thus has a higher street priority than the second track. A reason for this may be that the more faces along a track, the more populated the track may be. This may indicate, for example, a main street.

In another example, a first track associated with a greater number of license plates than a second track may indicate that the first track is busier than the second track, and thus has a higher street priority than the second track. A reason for this may be that the more license plates along a track, the more cars along the track. This may indicate, for example, a main street or a highway.

In another example, a first track associated with a greater number of businesses than a second track may indicate that the first track is busier than the second track, and thus has a higher street priority than the second track. A reason for this may be that the more businesses along a track, the more cars along the track. This may indicate, for example, a main street.

A priority score algorithm may vary. For example, a priority score may be dependent on a context. In one example, detecting an object of a first type may increase a priority score more than detecting an object of a second type. For example, detecting a license plate may increase a priority score more than detecting text designating a business because license plates may indicate a busier street than a business. License plates are typically found on highways and businesses are not typically found on highways.

In another example, different businesses or types of businesses may have a different effect on a priority score. Particular businesses or types of businesses may increase a priority score more than other businesses or types of businesses. For example, service-oriented businesses (e.g., law offices, accounting offices, dental offices) tend to be on main, artery streets and may indicate a main street, and gas stations tend to be close to highways. A variety of algorithms may be used to determine a business or type of business. For example, if business text detector module 124 detects text of a sign that includes "dental office," business text detector module 124 may designate the business as a dental office.

In one embodiment, business text detector module 124 detects text designating a business, and determines a type of the business based on the detected text. Priority score module 128 can generate a priority score associated with a track based at least on the type of the business.

In one example, a priority score may be dependent on a time of day. In one embodiment, a first number of times objects of a first type appear in photographic images geocoded along a track is determined at a first time, and a second number of times objects of the first type appear in photographic images geocoded along the track is determined at a second time. The first time can be, for example, at a time when the track is congested (e.g., during rush hour). The second time can be, for example, at a time when the track is not congested (e.g., 2 A.M.). Priority score module 128 can generate a priority score associated with a track based on a time of day that the driving directions are generated. In this example, different priority scores can be generated for one track, and the track may be selected over another track depending on a time of day.

Priority score module 128 may obtain a number of times an object appears in a photographic image in a variety of ways. For example, in one embodiment, a detector module can send a number of times a particular object appears in a photographic image associated with a track to priority score module 128. In another embodiment, priority score module 128 may request from a detector module a number of times a particular object appears in a photographic image associated with a track.

Processing pipeline server 108 stores priority scores associated with their respective tracks in map database 132. Map database 132 includes an exemplary map table 136 that includes data associated with a first track and a second track. Map table 136 includes a first column 140 "Track" that specifies a track that may be included in a driving route generated for a user. Objects of a particular type can be detected along the tracks and a priority score generated based on a number of times objects of the particular type appear in images associated with their respective tracks.

A second column 144 "Faces" includes a number of times faces appear in photographic images associated with their respective tracks. In one example, face detector module 116 determines that 15 faces appear in photographic images associated with the first track and 6 faces appear in photographic images associated with the second track, and this information may be stored in map table 136.

A third column 148 "License Plates" includes a number of times license plates appear in photographic images associated with their respective tracks. In one example, license plate detector module 120 determines that 10 license plates appear in photographic images associated with the first track and 8 license plates appear in photographic images associated with the second track, and this information may be stored in map table 136.

A fourth column 152 "Business Text" includes a number of times text designating a business appears in photographic images associated with their respective tracks. In one example, business text detector module 124 determines that text designating a business appears 2 times in photographic images associated with the first track and 3 times in photographic images associated with the second track, and this information may be stored in map table 136.

A fifth column 156 "Priority Score" includes a priority score generated by priority score module 128. In one example, a priority score of 64 is associated with the first track, and a priority score of 32 is associated with the second track. Priority score module 128 may store this information in map table 136.

In another embodiment, map table 136 may include more or less columns and information than that shown in FIG. 1. For example, in one embodiment, map table 136 keeps track of only a number of faces that appear in a photographic image associated with a track. In another embodiment, map table 136 includes an additional column "Rank" that ranks the tracks according to an associated priority score.

As shown in FIG. 1, system 100 also includes a client 164. Client 164 communicates with one or more servers 168, for example, across network(s) 172. Client 164 may be a general-purpose computer. Alternatively, client 164 can be a specialized computing device such as, for example, a mobile handset. Similarly, server 168 can be implemented using any computing device capable of serving data to client 164.

Map database 112 may be accessible to users of the web, for example, through web server 168 via network 172. Server 168 may include a web server. A web server may be a software component that responds to a hypertext transfer protocol (HTTP) request with an HTTP reply. As illustrative examples, the web server may be, without limitation, Apache HTTP Server, Apache Tomcat, Microsoft Internet Information Server, JBoss Application Server, WebLogic Application Server, or Sun Java System Web Server. A web server may serve content such as hypertext markup language (HTML), extendable markup language (XML), documents, videos, images, multimedia features, or any combination thereof. This example is strictly illustrative and does not limit embodiments.

Server 168 includes a driving direction module 176 and a tile generation module 180. Driving direction module 176 generates a driving route from a starting location to an ending location, and determines which tracks to include in the driving route by using map database 112. The starting and ending locations may be obtained from a user via client 164.

In one example, a driving route may include the first track or alternatively the second track shown in map table 136. Driving direction module 176 may identify the track associated with a greater priority score and use the identified track in the driving route. In this example, since the first track has a greater priority score than the second track, driving direction module 176 may include the first track in the driving route and not the second track.

Tile generation module 180 may serve map tiles rendered from map data to be displayed at client 164. Tile generation module 180 may use the driving route generated by driving direction module 176 to render the map for a user at client 164. Particular tracks may be identified as being associated with a high or low priority score. In one embodiment, the generation module 180 may alter an appearance of a track based on the priority score. For example, tracks associated with a high priority score can be highlighted in yellow for a user to see on a display. In this way, a user can visually determine which tracks are associated with a high priority score. Thus, the user may be aware of which tracks are busier than others.

Network 172 can be any network or combination of networks that can carry data communication, and may be referred to herein as a computer network. Such network 172 can include, but is not limited to, a local area network, medium area network, and/or wide area network such as the Internet. Network 172 can support protocols and technology including, but not limited to, World Wide Web protocols and/or services. Intermediate web servers, gateways, or other servers may be provided between components of system 100 depending upon a particular application or environment.

In one embodiment, each of geocoded panoramic image database 104 and map database 112 may be implemented on a relational database management system. Examples of relational databases include Oracle, Microsoft SQL Server, and MySQL. These examples are illustrative and are not intended to be limiting. In another embodiment, each of geocoded panoramic image database 104 and map database 112 may be implemented on a non-relational database management system. Examples of non-relational database management systems include a file system.

Each of face detector module 116, license plate detector module 120, business text detector module 124, priority score module 128, tile generation module 156, and driving direction module 160 may be implemented in hardware, software, firmware or any combination thereof.

Embodiments of processing pipeline server 108 and server 152, or portions thereof can also be implemented as computer-readable code executed on one or more computing devices capable of carrying out the functionality described herein. Processing pipeline server 108 (and its component modules 116-128) and server 152 (and its components 156-160) may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Note that in alternative embodiments, any subset of the components shown in FIG. 1 may in fact be embodied as a single component. For example, the functionality of face detector module 116 and license plate detector module 120 may be combined in a single device or module. Other combinations of the functional components of FIG. 1 are also possible, as would be known to a person of skill in the art.

Further, processing pipeline server 108 and server 168 may have more or less than the components shown in FIG. 1. For example, in one embodiment, processing pipeline server 108 includes two license plate detector modules and does not include business text detector module 124, in another embodiment, server 168 includes face detector module 116, license plate detector module 120, business text detector module 124, priority score module 128, driving direction module 176, and tile generation module 180.

Each of the components of system 100 is described generally below and in more detail with respect to FIGS. 2 and 3.

Figure 2:
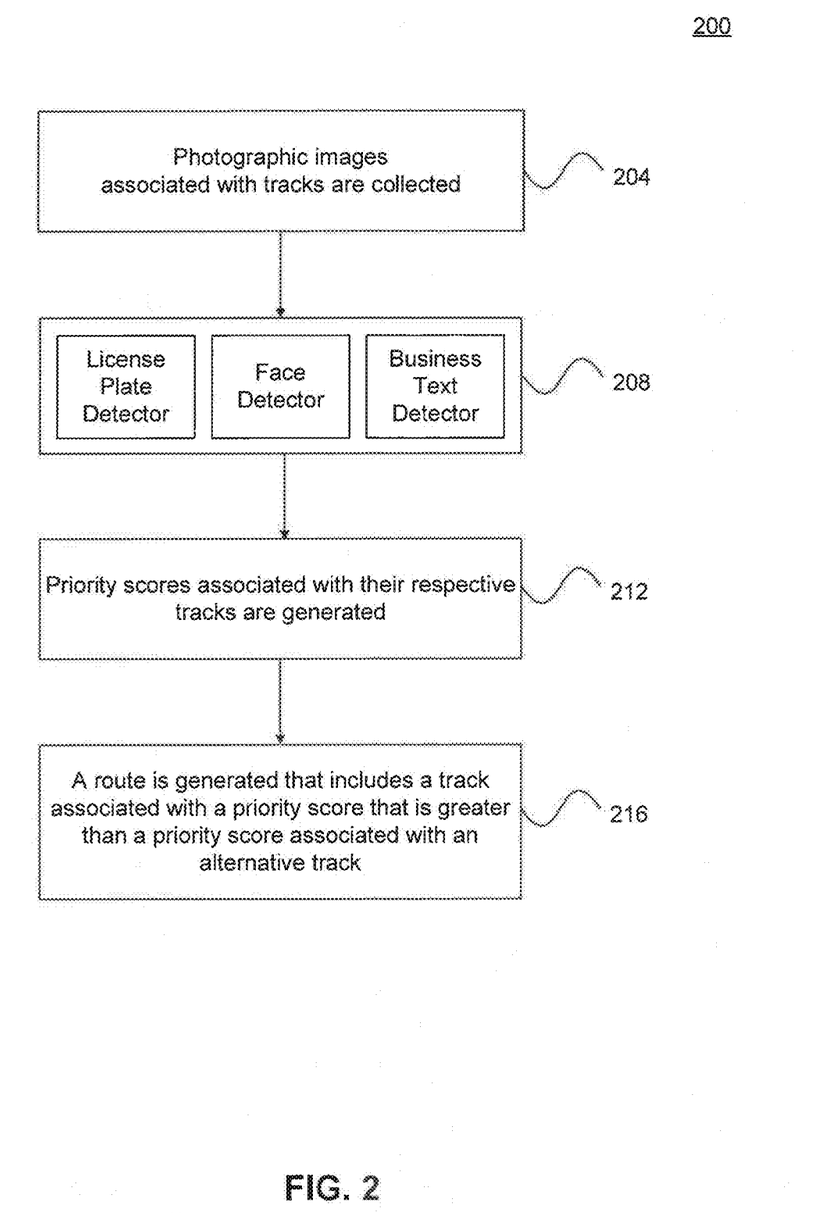
FIG. 2 is a flowchart illustrating a method for determining a driving route that includes a first track or a second track based on priority scores determined according to objects detected along the respective tracks, according to an embodiment.

FIG. 2 is a flowchart illustrating a method 200 for determining a driving route that includes a first track or a second track based on priority scores determined according to objects detected along the respective tracks, according to an embodiment. Method 200 may be used in operation of system 100.

At a stage 204, photographic images associated with tracks are collected. In one embodiment, photographic images associated with tracks are collected using a moving vehicle that uses a camera system mounted on a vehicle. In another embodiment, photographic images associated with tracks are collected by using public data sources.

At a stage 208, objects of a particular type are detected, in one embodiment, faces are detected by face detector module 116. Face detector module 116 may also determine a number of times faces appear in photographic images associated with a track. In another embodiment, license plates are detected by license plate detector module 120. License plate detector module 120 may also determine a number of times license plates appear in photographic images associated with a track. In another embodiment, text designating a business is detected by business text detector module 124. Business text detector module 124 may also determine a number of times text designating a business appear in photographic images associated with a track.

At a stage 212, priority scores associated with their respective tracks are generated. In one embodiment, a priority score associated with a track is generated by priority score module 128. Priority score module 128 may use a number of times an object of a particular type appears in a photographic image to generate the priority score.

At a stage 216, a route is generated that includes a track associated with a priority score that is greater than a priority score associated with an alternative track. In one embodiment, driving direction module 176 selects a first track associated with a priority score that is greater than a priority score associated with an alternative second track. In this embodiment, driving direction module 176 generates a route for a user that includes the first track and not the second track.

According to an embodiment, stages 204, 208, 212, and 216 may be performed by processing pipeline server 108 and server 168. In other embodiments, stages 204, 208, 212, and 216 may be performed by a single module, for example, server 168.

Figure 3:
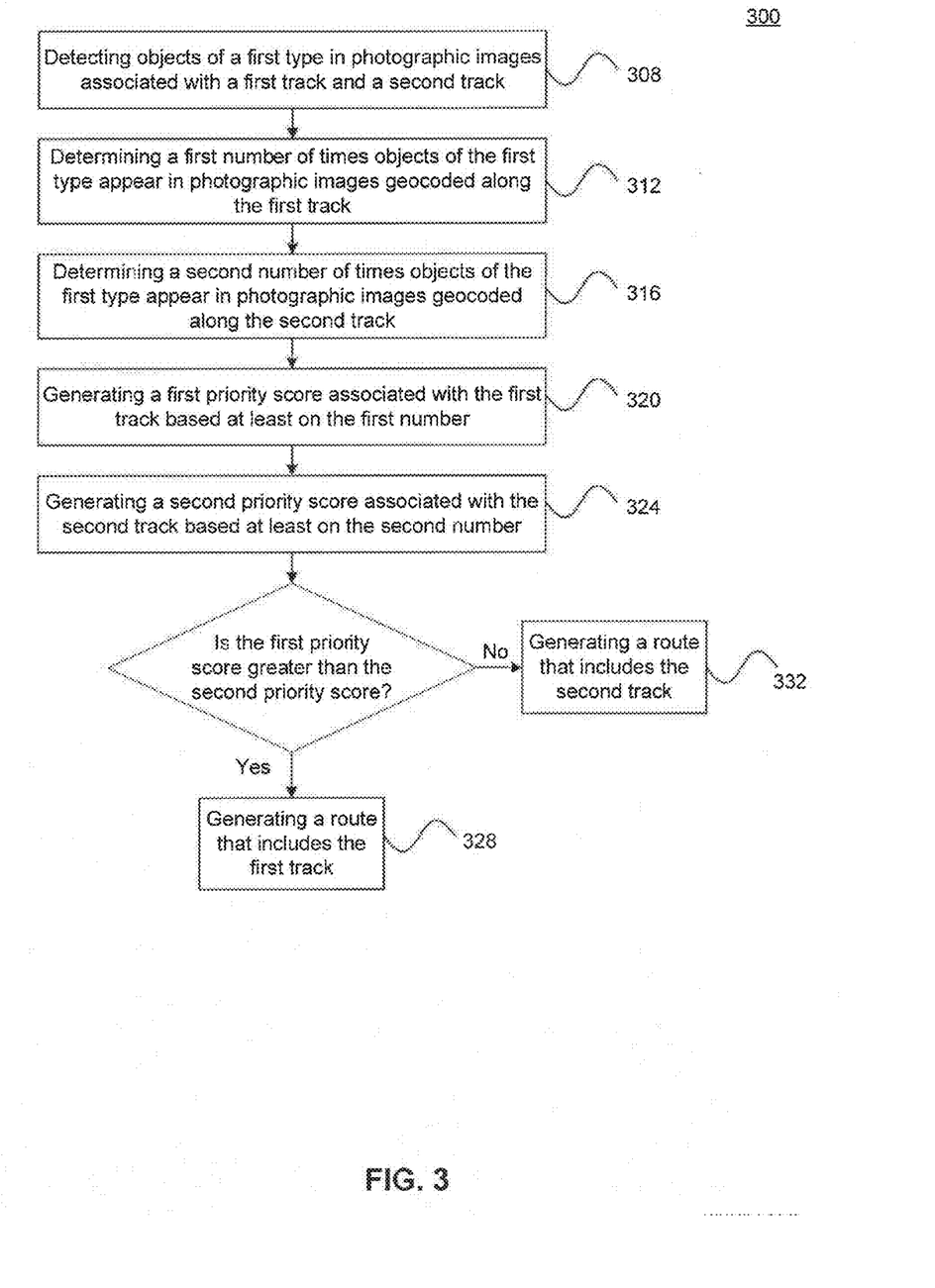
FIG. 3 is a flowchart illustrating another method for generating priority scores for respective tracks according to objects detected along the tracks, according to an embodiment.

FIG. 3 is a flowchart illustrating a method 300 for generating priority scores for respective tracks according to objects detected along the tracks, according to an embodiment. Method 300 may be used in operation of system 100.

At a stage 308, objects of a first type are detected in photographic images associated with a first track and a second track. Objects of the first type can be, for example, faces, license plates, and text designating a business. In one embodiment, face detector module 116 detects faces in photographic images associated with first and second tracks. In another embodiment, license plate detector module 120 detects license plates in photographic images associated with first and second tracks. In another embodiment, business text detector module 124 detects text designating a business in photographic images associated first and second with tracks.

At a stage 312, a first number of times objects of the first type appear in photographic images geocoded along the first track is determined. At a stage 316, a second number of times objects of the first type appear in photographic images geocoded along the second track is determined. In one embodiment, face detector module 116 determines a number of times faces appear in photographic images associated with the first and second tracks. In another embodiment, license plate detector module 120 determines a number of times license plates appear in photographic images associated with the first and second tracks. In another embodiment, business text detector module 124 determines a number of times text designating a business appear in photographic images associated with the first and second tracks.

At a stage 320, a first priority score associated with the first track is generated based at least on the first number. At a stage 324, a second priority score associated with the second track is generated based at least on the second number. In one embodiment, priority score module 128 generates a first priority score associated with the first track based at least on the first number, and generates a second priority score associated with the second track based at least on the second number.

At a stage 328, if the first priority score is greater than the second priority score, a route is generated that includes the first track. At a stage 332, if the first priority score is not greater than the second priority score, a route is generated that includes the second track. In one embodiment, driving direction module 176 generates the route that includes the first track or alternatively the second track.

While methods 200 and 300 are described with respect to an embodiment, methods 200 and 300 are not meant to be limiting and may be used in other applications. In one example, methods 200 and 300 may be used to determine a driving route that includes a first track or a second track based on priority scores associated with their respective tracks, like system 100 in FIG. 1. However, methods 200 and 300 are not meant to be limited to system 100.

Stages 204-216 and 308-332 may be implemented as software, hardware, firmware, or any combination thereof.

Operations for the above-described embodiments may be further described with reference to one or more logic flows. It will be appreciated that the representative logic flows do not necessarily have to be executed in the order presented or in any particular order. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 4:
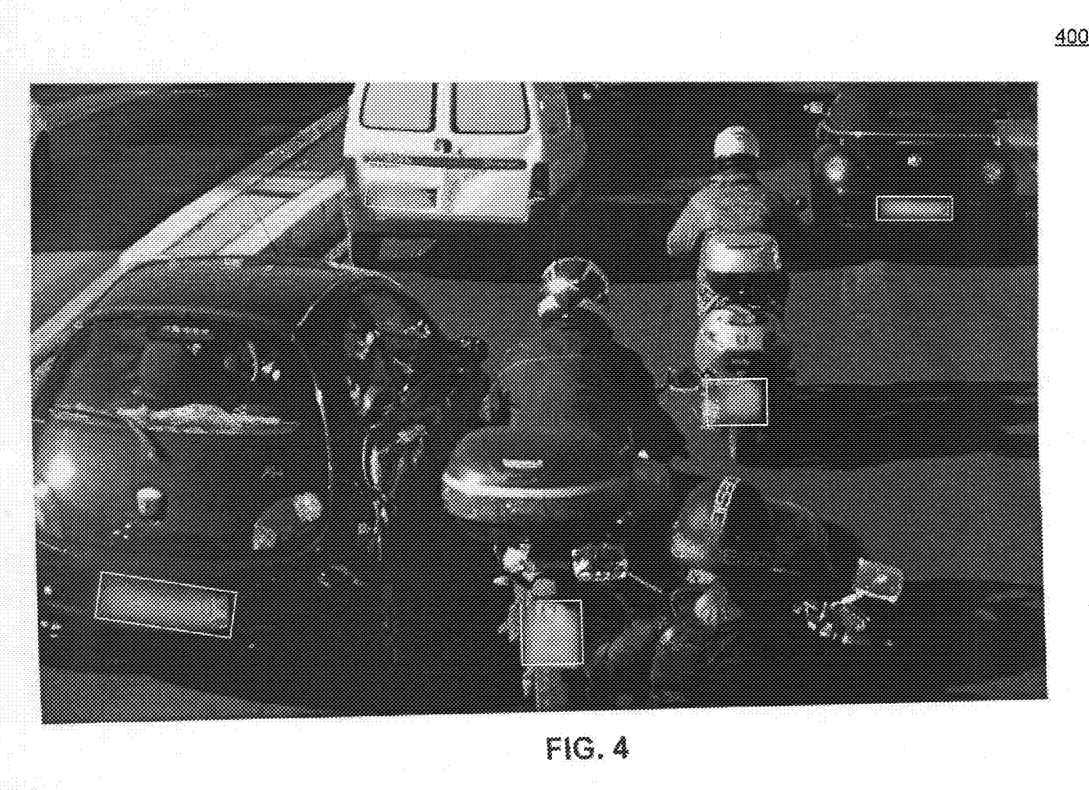
FIG. 4 is a diagram illustrating an example of detecting license plates in images, according to an embodiment.

FIG. 4 is a diagram 400 illustrating an example of detecting license plates in images. Diagram 400 includes an image that includes license plates of varying size. As indicated by the boxes in diagram 400, license plates have been detected. Further, a number of the license plates that appear in the photographic image can be determined.

The Summary and Abstract sections may set forth one or more but not all exemplary embodiments as contemplated by the inventor(s), and thus, are not intended to be limiting.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present specification. Therefore, such adaptations and modifications are intended to be within the meaning and range of equivalents of the disclosed embodiments, based on the teaching and guidance presented herein, it is to be understood that the phraseology or terminology herein is for the purpose of description and not of limitation, such that the terminology or phraseology of the present specification is to be interpreted by the skilled artisan in light of the teachings and guidance.

The breadth and scope of embodiments should not be limited by any of the above-described exemplary embodiments, but should be defined only in accordance with the following claims and their equivalents.

What is claimed is:

1. A system for determining a driving route that includes a first track or alternatively a second track, comprising:
   a first object detector module configured to detect objects of a first type in photographic images associated with the first and second tracks,
   the first object detector module configured to determine a first number of times objects of the first type appear in photographic images geocoded along the first track, and to determine a second number of times objects of the first type appear in photographic images geocoded along the second track;
   a priority score module configured to generate a first priority score associated with the first track based at least on the first number, the priority score module further configured to generate a second priority score associated with the second track based at least on the second number; and
   a driving direction module configured to select a driving route that includes the first track when the first priority score is greater than the second priority score, and to select a driving route that includes the second track when the second priority score is greater than the first priority score, wherein when the first number is greater than the second number, the first priority score is greater than the second priority score.

2. The system of claim 1, wherein the first object detector module is configured to detect faces.

3. The system of claim 1, wherein the first object detector module is configured to detect license plates.

4. The system of claim 1, wherein the first object detector module is configured to detect text designating a business.

5. The system of claim 1, further comprising:
   a second object detector module is configured to detect objects of a second type, different from the first type, in photographic images associated with the first and second tracks,
   the second object detector module further configured to determine a third number of times objects of the second type appear in photographic images associated with the first track, and further configured to determine a fourth number of times objects of the second type appear in photographic images associated with the second track,
   wherein the priority score module is configured to generate the first priority score based at least on the third number, the score generator further configured to generate the second priority score based at least on the fourth number.

6. The system of claim 5, wherein the first object detector module is configured to detect faces and the second object detector module is configured to detect license plates.

7. The system of claim 1, wherein the photographic image is taken from a camera rosette that takes panoramic images.

8. The system of claim 1, wherein the photographic image is at least a portion of a street-level panoramic image.

9. The system of claim 1, further comprising:
a tile generation module configured to serve map tiles rendered from map data.

10. The system of claim 9, wherein the tile generation module is further configured to alter an appearance of a track based on the priority score.

11. A method for determining a driving route that includes a first track or a alternatively a second track, comprising:
(a) detecting, on a computing device, objects of a first type in photographic images associated with the first and second tracks;
(b) determining a first number of times objects of the first type appear in photographic images geocoded along the first track;
(c) determining a second number of times objects of the first type appear in photographic images geocoded along the second track;
(d) generating a first priority score associated with the first track based at least on the first number;
(e) generating a second priority score associated with the second track based at least on the second number;
(f) when the first priority score is greater than the second priority score, selecting a driving route that includes the first track; and
(g) when the second priority score is greater than the first priority score, selecting a driving route that includes the second track,
wherein when the first number is greater than the second number, the first priority score is greater than the second priority score.

12. The method of claim 11, further comprising:
collecting photographic images associated with the first track and the second track.

13. The method of claim 11, further comprising:
collecting photographic images associated with the first track and the second track from public sources.

14. The method of claim 11, wherein detecting objects of the first type comprises detecting faces.

15. The method of claim 11, wherein detecting objects of the first type comprises detecting license plates.

16. The method of claim 11, wherein detecting objects of the first type comprises detecting text designating a business, further comprising:
determining a type of the business based on the detected text,
wherein the generating the first priority score (d) comprises generating the first priority score based on the determined type of the business.

17. The method of claim 11, wherein the priority scores are dependent on a context.

18. The method of claim 17, wherein the context is a time of day.

19. The method of claim 11, further comprising:
detecting objects of a second type, different from the first type, in photographic images associated with the first and second tracks;
determining a third number of times objects of the second type appear m photographic images geocoded along the first track; and
determining a fourth number of times objects of the second type appear in photographic images geocoded along the second track,
wherein the generating (d) comprises generating the first priority score based at least on the third number, and the generating (e) comprises generating the second priority score based at least on the fourth number.

20. An apparatus comprising at least one non-transitory computer readable storage medium encoding instructions thereon that, in response to execution by a computing device, cause the computing device to perform operations comprising:
detecting objects of a first type in photographic images associated with the first and second tracks;
determining a first number of times objects of the first type appear in photographic images geocoded along the first track;
determining a second number of times objects of the first type appear in photographic images geocoded along the second track;
generating a first priority score associated with the first track based at least on the first number;
generating a second priority score associated with the second track based at least on the second number;
selecting a driving route that includes the first track when the first priority score is greater than the second priority score; and
selecting a driving route that includes the second track when the second priority score is greater than the first priority score,
wherein when the first number is greater than the second number, the first priority score is greater than the second priority score.

21. The apparatus of claim 20, the operations further comprising:
detecting objects of a second type, different from the first type, in photographic images associated with the first and second tracks;
determining a third number of times objects of the second type appear in photographic images associated with the first track;
determining a fourth number of times objects of the second type appear in photographic images associated with the second track;
generating the first priority score based at least on the third number; and
generating the second priority score based at least on the fourth number.

* * * * *